(12) United States Patent
Monaghan

(10) Patent No.: US 6,324,934 B1
(45) Date of Patent: Dec. 4, 2001

(54) ROBOT ARM

(75) Inventor: Marty Monaghan, Sunnyvale, CA (US)

(73) Assignee: Creative Design Corporation, Montville, NJ (US)

( * ) Notice: Subject to any disclaimer, the term of this patent is extended or adjusted under 35 U.S.C. 154(b) by 0 days.

(21) Appl. No.: 09/516,796

(22) Filed: Mar. 1, 2000

Related U.S. Application Data

(60) Provisional application No. 60/122,184, filed on Mar. 1, 1999.

(51) Int. Cl.[7] .................................................. B25J 17/00
(52) U.S. Cl. ................................. 74/490.04; 901/21
(58) Field of Search ........................... 74/490.04, 490.1; 414/744.1, 744.2, 744.5; 901/14, 15, 21, 23, 36, 17

(56) References Cited

U.S. PATENT DOCUMENTS

| | | | |
|---|---|---|---|
| 3,335,620 | * | 8/1967 | Vertut .................................. 901/21 X |
| 4,299,533 | * | 11/1981 | Ohnaka ............................... 901/21 X |
| 4,500,251 | * | 2/1985 | Kiryu et al. ......................... 901/21 X |
| 4,897,015 | * | 1/1990 | Abbe et al. ......................... 901/21 X |
| 4,946,337 | * | 8/1990 | Tonai et al. ......................... 901/21 X |
| 5,064,340 | * | 11/1991 | Genov et al. ....................... 901/15 X |
| 5,271,292 | * | 12/1993 | Sawada et al. ...................... 74/490.04 |
| 5,314,293 | * | 5/1994 | Carisle et al. ....................... 414/744.5 |
| 5,587,637 | * | 12/1996 | Ohyama ............................. 901/23 X |
| 5,640,883 | * | 6/1997 | Takizawa .......................... 74/490.04 |
| 5,778,730 | * | 7/1998 | Solomon et al. .................. 74/490.04 |

* cited by examiner

*Primary Examiner*—David A. Bucci
*Assistant Examiner*—Colby Hansen
(74) *Attorney, Agent, or Firm*—Lerner, David, Littenberg, Krumholz & Mentlik, LLP

(57) ABSTRACT

A robot arm comprises a first and a second link, the first link having a proximal end and a distal end and the second link having a proximal and a distal end. A fixed pulley, with circumferential surfaces concentric with the first pivot axis is mounted at the proximal end of the first link. A second-link pulley is fixed to the second link for rotation about the second pivot axis. An end effector pulley is fixed to the end effector for rotation about the third pivot axis. A first belt drive is also provided and includes one or more belts connected between the circumferential surfaces of the fixed pulley and the second link pulley so that ratation of the first link relative to the fixed pulley about the first pivot axis causes rotation of the second link about the second pivot axis relative to the first link. One or more idler pulleys is provided and is rotatably mounted to one or both of the links. At least one of the belt drives includes a first belt engaged with the first circumferential surface of an idler pulley and a second belt engaged with the second circumferential surface of the same idler pulley.

16 Claims, 3 Drawing Sheets

ROBOT ARM

CROSS REFERENCE TO RELATED APPLICATION

This application claims the benefit of U.S. provisional patent application No. 60/122,184 filed on Mar. 1, 1999, the disclosure of which is incorporated by reference.

FIELD OF THE INVENTION

The present invention relates to a robot arm having an end effector located at the remote end of the robot arm maintaining the same orientation regardless of rotational movements of the arm. The robot arm also has at least one idler pulley located within one of the links that allow the diameter of the joints to be enlarged so that wires or other elongated components may pass through the interior of the joints.

BACKGROUND OF THE INVENTION

In the semiconductor industry, robot arms have typically been employed to move semiconductor wafers from one location to another. It is desired in the design of a robot arm in the semiconductor industry to have the end effector maintain the same orientation when the arm moves radially inward and outward. As discussed, for example, in U.S. Pat. Nos. 4,299,533 and 5,064,340, robot arms have been provided with two links and an end effector mounted at a distal end of the second link. The proximal end of the first link is mounted coaxially with a pulley, referred to herein as the "fixed" pulley. The proximal end of the second link is pivotally connected to the distal end of the first link. A first belt connects the fixed pulley to a second link pulley at the proximal end of the second-link, whereas a second belt connects a housing fixed to the distal end of the first link to a pulley on the end effector. If the lengths of the links are equal, and if the pulleys are selected so that the ratio of rotation of the end effective to rotation of the second link is $-\frac{1}{2}$ and the ratio of rotation of the second link to rotation of the first link is $-2$, the end effector will remaining fixed orientation but will move radially when the first link rotates relative to the fixed pulley.

While this approach is effective, it imposes some serious design constraints. To provide the desired ratios, a relatively large end effector pulley is needed. For the end effector to rotate one-half the rotation of the second link, the pulley at the end effector must be twice as large as the housing on the distal end of the first link. When the pulley at the end effector is large, it adds significant mass to the end of the robot arm, increasing inertia and making it much more difficult to control precisely the movements of the arm.

Also, to provide the desired ratios, the second link pulley and the housing at the distal end of the second link must be of relatively small diameter, i.e., half the diameter of the fixed pulley. This makes it difficult to connect to wires, pneumatic tubes, or other elongated components extending from the first to the second neighboring link through a hollow bore at the exit of the second link pulley and housing. Such wires, tubes and other elongated components are usually part of the control system for controlling the end effector. Thus, it would be desired to create a robot arm with enough space at the joint between the links so that these wires and tubes can pass through the center of the joint.

The robot arm of the present invention addresses the problems set forth above and is described more fully below.

SUMMARY OF THE INVENTION

In accordance with one embodiment of the present invention, a robot arm comprises a first and a second link, the first link having a proximal end and a distal end and the second link having a proximal and a distal end. The proximal end of the first link is pivotally connected to a base for rotation relative to a first pivot axis. The proximal end of the second link is pivotally mounted to the distal end of the first link and is capable of rotation about a second pivot axis that is parallel to the first pivot axis. An end effector is pivotally connected to the distal end of the second link and is capable of rotation about a third pivot axis which is parallel to the first and second pivot axes. A fixed pulley, with a circumferential surface concentric with the first pivot axis is mounted at the proximal end of the first link. A second-link pulley is fixed to the second link for rotation with the second link about the second pivot axis. The second link pulley has a circumferential surface concentric with the second pivot axis. A housing is provided and is fixed to the first link at its distal end. The housing has a circumferential surface concentric with the second pivot axis. An end effector pulley is fixed to the end effector for rotation about the third pivot axis and the end effector pulley has circumferential surfaces concentric with the third pivot axis. A first belt drive is also provided and includes one or more belts connected between the circumferential surface of the fixed pulley and the circumferential surface of the second-link pulley so that rotation of the first link relative to the fixed pulley about the first pivot axis causes rotation of the second link about the second pivot axis relative to the first link. The first belt drive is arranged to provide a first ratio between the rotation of the first link relative to the fixed pulley and rotation of the second link relative to the fixed pulley. A second belt drive includes one or more belts connected between the circumferential surface of the housing and the circumferential surface of the end effector pulley so that rotation of the second link relative to the first link, about the second pivot axis, causes rotation of the end effector about the third pivot axis relative to the second link. The second belt drive is arranged to provide a second ratio between the rotation of the second link relative to the first link and rotation of the end effector relative to the second link. One or more idler pulleys are provided and are rotatably mounted to one or both of the links. Each of the idler pulleys define a first and second circumferential surface. At least one of the belt drives includes a first belt engaged with the first circumferential surface of an idler pulley and a second belt engaged with the second circumferential surface of the same idler pulley.

Preferably, the first ratio has a value of $-2$ where rotation of the first link through an angle $\theta$ causes the second link pulley and the second link to turn through an angle of $-2\theta$ with respect to the first link. Thus, if the first link travels through a 45° angle counterclockwise, this will result in the second link pulley and the second link turning through an angle of 90° in the clockwise direction relative to the first link.

It is also preferred that the second ratio has a value of $-\frac{1}{2}$ where rotation of the second link through an angle $\theta$ causes the end effector pulley and the end effector to turn through an angle of $-\frac{1}{2}\theta$ with respect to the second link. For example, if the second link turns through an angle of 90 degrees in the clockwise direction, this will result in the end effector pulley and the end effector turning through an angle of 45° in the counterclockwise direction relative to the second link.

Because one or more of the belt drives includes an idler pulley and two belts, the pulley and housing diameters need not be selected as described above in connection with the prior art belt drives. For example, where the robot arm includes a first idler pulley mounted to the first link, the first belt of the first belt drive engages the first circumferential surface of the idler pulley and the circumferential surface of the fixed pulley. The second belt of the first belt drive engages the second circumferential surface of the first idler pulley and the circumferential surface of the second-link pulley.

Also preferably, the robot arm has a second idler pulley mounted to the second link. The second belt drive desirably comprises a first belt extending from the circumferential s surface of the housing to the first circumferential surface of the second idler pulley. The second belt drive desirably further comprises a second belt extending from the second circumferential surface of the second idler pulley to the end effector pulley. Preferably, the ratio of the diameter of the first circumferential surface of the second idler pulley to the diameter of the second circumferential surface of the second idler pulley is more than 1:1 as, for example 2:1. This ratio of more than 1:1 in the second idler pulley allows a relatively smaller end effector pulley on a smaller housing, or both, than what will be provided in the absence of the second idler pulley.

Preferably, the robot arm further includes elongated components and the second link pulley and housing include an internal bore. The elongated components desirably extend from the first link through the bore and into the second link. These elongated components may include wires, fiber optics or pneumatic or hydraulic hoses that are needed to operate the robot arm. The end effector pulley may also include an internal bore, and the elongated components can extend from the second link to the end effector.

Preferably, the robot arm further includes a base and a first rotary motion actuator that is connected to the base of rotation for rotating the first link relative to the fixed pulley about the first pivot axis so as to move the end effector radially as described above. A further rotary motion actuator may be provided for rotating the fixed pulley and the first link so as to swing the entire arm about the first pivot axis.

DETAILED DESCRIPTION OF THE PREFERRED EMBODIMENT

Figure 1:
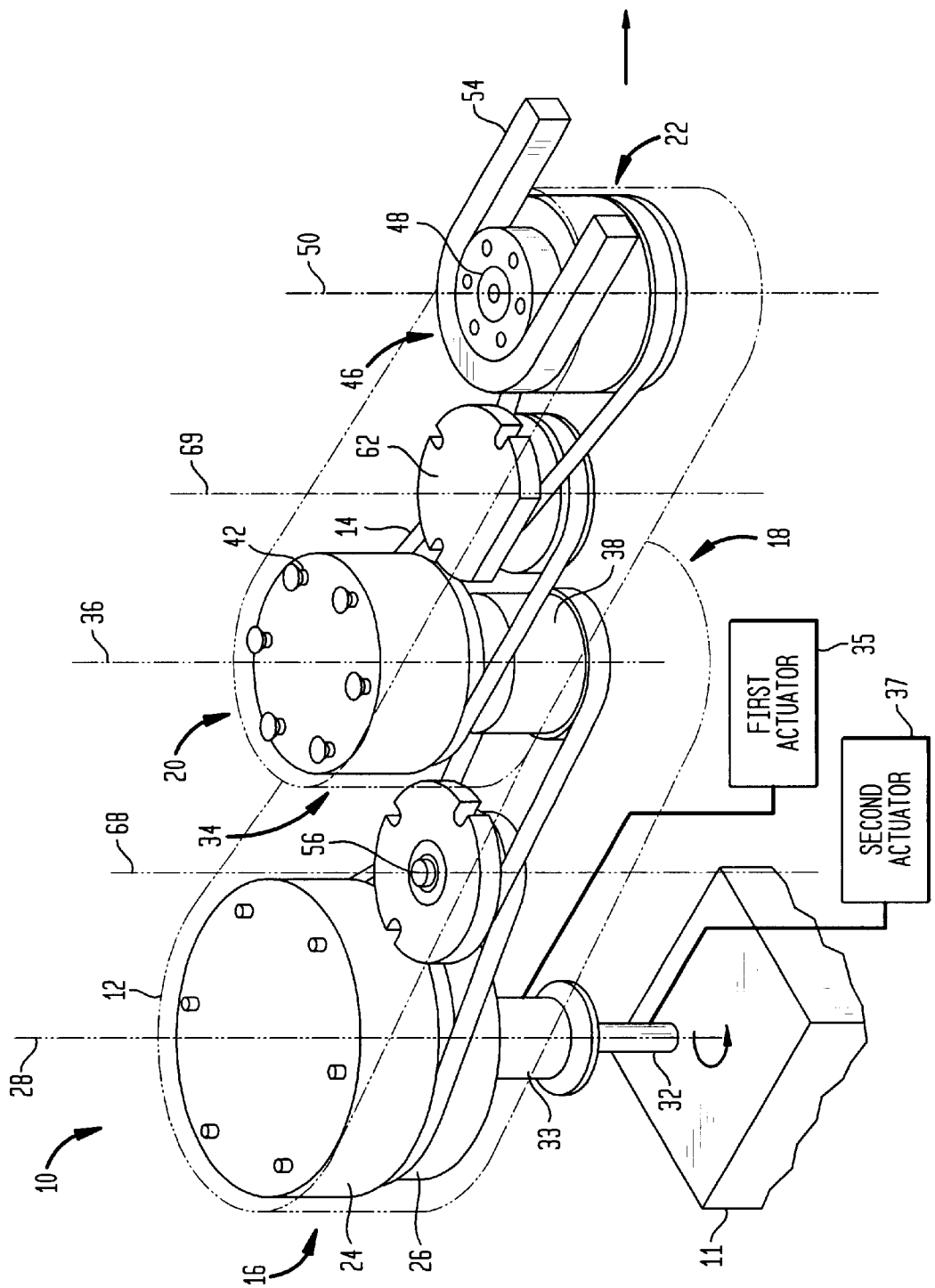
FIG. 1 is a perspective view of a robot arm in accordance with one embodiment of the present invention.
Figure 2:
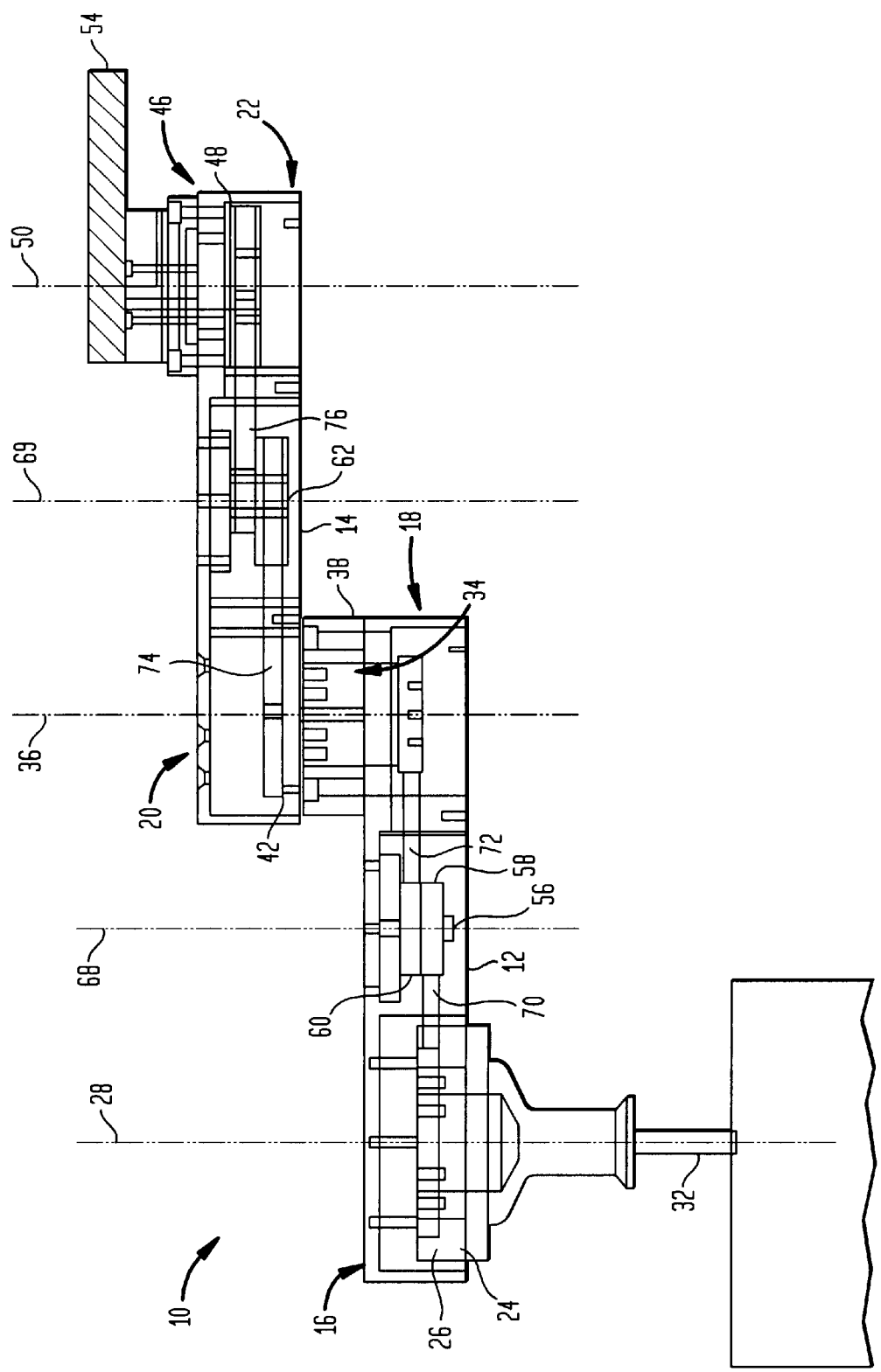
FIG. 2 is a cross-sectional elevational view of the robot arm in FIG. 1.
Figure 3:
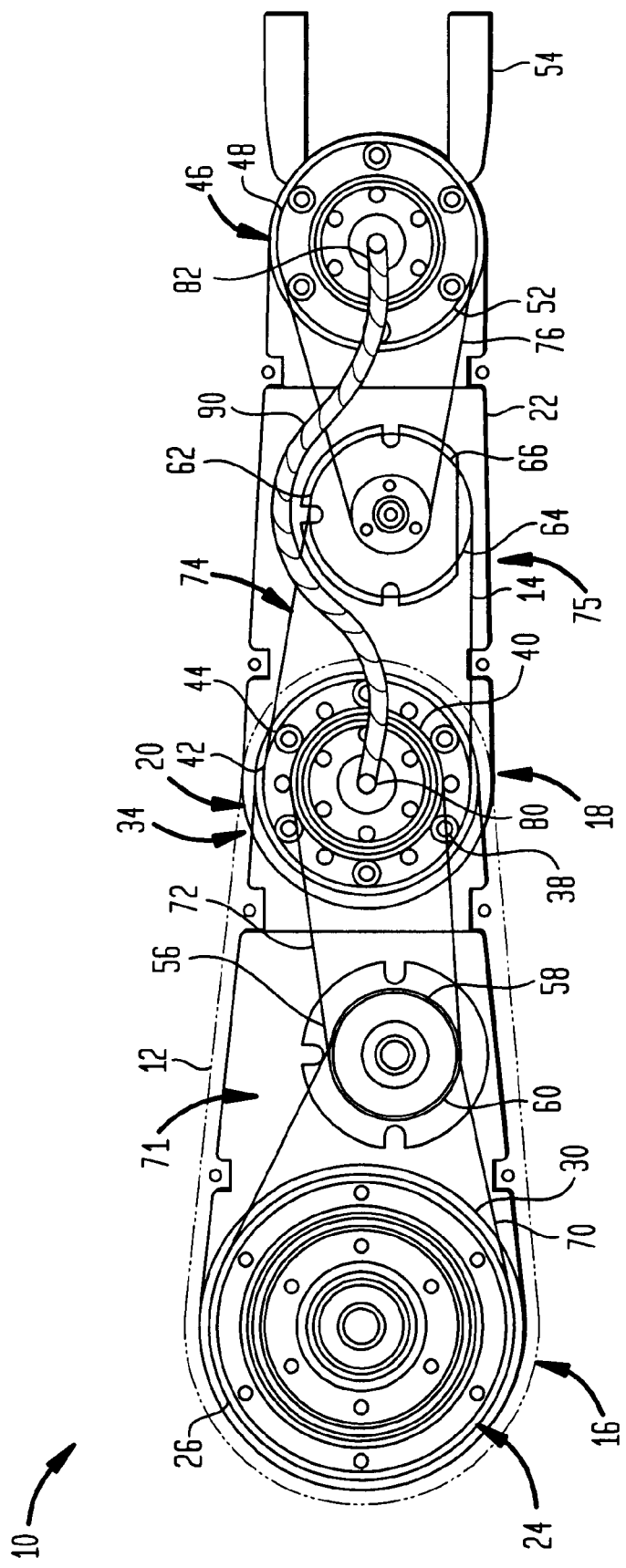
FIG. 3 is a top cross-sectional view of the robot arm of FIG. 1 with the first link partially shown in phantom.

As shown in FIGS. 1–3, a robot arm 10 is mounted to a base 11 and has a first link 12 and a second link 14. The first link has a proximal end 16 and a distal end 18. Likewise, the second link 14 has a proximal end 20 and a distal end 22. The first and second links 12 and 14 are preferably hollow and can be made of metal, plastic or any other suitable material. First link 12 is mounted to base 12 for rotation relative to the base about a first pivot axis 28 of a first joint 24 at the proximal end 16 of the first link 12. A fixed pulley 26 is also mounted for rotation about the first pivot axis 28 at the first joint 24. The fixed pulley 26 includes a circumferential surface 30 (FIG. 3) that is concentric with the first pivot axis 28. Also extending from the first joint 24 is a shaft 32 fixed to the first pulley and a drive pulley 33 fixed to first link 12. Drive pulley 33 is connected to a first rotary motion actuator 35 so that the first actuator can drive the first link in rotation about axis 28. Shaft 32 is connected to a second actuator 37 which can drive the fixed pulley 24 in rotation about the axis 28 concurrently with rotation of the first link 12 or hold the drive pulley fixed against such rotation. The first actuator may include any conventional rotary actuator such as, for example, a stepped motor, a conventional electric motor, or the like. The second actuator may include similar components, or may include a first brake to link the fixed pulley 24 to arm 12 for rotation therewith and a second brake to hold the fixed pulley in a fixed position relative to the housing. The first and second actuators are commanded by a conventional control system (not shown).

The first link 12 and the second link 14 are pivotally connected at a second joint 34. The first and second links 12 and 14 are able to rotate with respect to each other about a second pivot axis 36 that is parallel to the first pivot axis 28. A second-link pulley 38 is mounted on the second joint 34 and has a circumferential surface 40 that is concentric with the second pivot axis 36. The second-link pulley 38 is fixed to the second link 14. A housing 42 is also provided at the second joint 34 and is fixed to the first link 12. The housing 42 also has a circumferential surface 44 that is concentric with the second pivot axis 36.

A third joint 46 is provided at the distal end 22 of the second link 14. An end effector pulley 48 is mounted at the third joint 46 and is able to rotate about a third pivot axis 50. The end effector pulley 48 has a circumferential surface 52 concentric with the third pivot axis 50. An end effector 54 is attached to the end effector pulley 48 and is capable of rotation about the third pivot axis 50. The end effector 54 may include fingers or other fixtures for holding a workpiece to be moved.

A first idler pulley 56 is mounted to the first link 12 between the fixed pulley 26 and second-link pulley 38. The first idler pulley 56 has a first circumferential surface 58 and a second circumferential surface 60. A second idler pulley 62 is mounted to the second link 14 and has a first circumferential surface 64 and a second circumferential surface 66. The first and second idler pulleys 56 and 62 rotate about axes 68 and 69 that are parallel to the first, second and third pivot axes 28, 36 and 50.

A first belt drive 71 on first link 12 includes a first belt 70 engaging the circumferential surface of the fixed pulley 30 and the first circumferential surface of the first idler pulley 58, and a second belt 72 extending from the second circumferential surface 66 of the first idler pulley 62 to the circumferential surface 40 of the second-linked pulley. A second belt drive 75 on second link 14 includes a first belt 74 extending from the circumferential surface 44 of the housing 42 to the first circumferential surface 64 of the second idler pulley 62. A second belt 76 extends from the second circumferential surface 66 of the second idler pulley 62 to the circumferential surface 52 of the end effector pulley 48. The first and second belts 74 and 76 of the second idler pulley 62 form the second belt drive 75 of the second link. The belts 70, 72, 74 and 76 are preferably belts having cleats on teeth, of the type commonly referred to as "timing belts" and are held taut to the pulleys. The pulleys have mating teeth on their circumferential surfaces. It should be appreciated by those skilled in the art that the belts can be conventional friction drive belts, v-belts or chains and the pulleys would be selected accordingly.

In operation, to move the end effector radially, a first actuator 35 causes the first link 12 to rotate about the first pivot axis 28 while second actuator 37 holds the fixed pulley 26 against rotation. Because the fixed pulley 26 is stationary with respect to the first link 12, the rotation of the first link 12 results in the first idler pulley 56 rotating in the opposite direction as the first link 12. As best seen in FIG. 3, if for example the first link is rotated in the counter clockwise direction, the first idler pulley 56 will rotate in the clockwise direction with respect to the first link causing the second belt 72 of the first belt drive to move. The second belt 72 of the first idler pulley 56 is engaged with the second-link pulley 38, which is fixed to the second link 14. The movement of belt 72 causes clockwise movement of the second-linked pulley 38 so that the second link 14 rotates about the second pivot axis 36 in the clockwise direction relative to the first link 12.

The amount of movement of the second link relative to the first link depends on the overall ratio provided by the first belt drive 71 on the first link. This in turn depends on the ratio of the diameters of the fixed pulley 26 and the second-link pulley 38 as well as the ratio of the diameters, of the first circumferential surface 58 and second circumferential surface 60 of the first idler pulley 56. In the particular embodiment shown, the diameter of the fixed pulley 26 is twice the diameter of the second-link pulley 38. Thus, whereas the first and second circumferential surfaces 58 and 60 of the first idler pulley 56 have the same diameter, a 45° rotation of the first link 12 in the counter clockwise direction will result in a 90° rotation of the second link 14 in the clockwise direction relative to the first link 12.

Because the housing 42 is fixed to the first link 12, rotation of second link 14 relating to first link 12 causes the first belt 74 of the second belt drive 75 to move relative to the second link 14. For example, if the second link rotates in the clockwise direction, the first belt 74 of the second idler pulley 62 will move and will turn the second idler pulley 62 in the counter clockwise direction relative to the second link. This moves the second belt 76, engaged with the second circumferential surface 66 of the second idler pulley 62, in the counter clockwise direction. As the second belt 76 of the second belt drive 75 is engaged with the end effector pulley 48, the movement of second belt 76 results in the end effector 54 also turning in the counter clockwise direction relative to second link 14.

As best shown in FIG. 3, the amount of movement of the end effector 54 relative to the second link 14 depends on the diameters of the circumferential surface 44 of the housing 42, the ratio of diameters of the first and second circumferential surfaces 64 and 66 of the second idler pulley 62 and the diameter of the circumferential surface 52 of the end effector pulley 48. In the particular embodiment illustrated, the ratio of diameters between the circumferential surface 44 of the housing 42 and the first circumferential surface 64 of the second idler pulley 62 is 1:1. Thus, the second link turning 90° in the clockwise direction results in the second idler pulley rotating 90° in the counter clockwise direction. The diameter of the second circumferential surface 66 of the second idler pulley is ½ the diameter of the first circumferential surface 64. A 90° rotation of the first circumferential surface 64 will result in a 90° rotation of the second circumferential surface 66 but the linear movement of belt 76 is only ½ the linear movement of belt 74. Further, the ratio of the diameters of the second circumferential surface 66 of the second idler pulley 62 to the diameter of the circumferential surface 52 of the end effector pulley 48 is ½:1. Thus, if the second idler pulley 62 rotates through 90°, the end effector pulley would only rotate 45°. Because the end effector 54 is rigidly attached to the end effector pulley 48, the end effector also rotates 45°. This arrangement translates a 90° clockwise movement of the second link 14 relative to the first link into a 45° counter clockwise movement of the end effector 54.

By having a −2 ratio between the fixed pulley 26 and the second-link pulley 38 and a −½ ratio between the housing 42 and the end effector pulley 48 maintains the orientation of the end effector 54 throughout the rotational movements of the first and second links 12 and 14. In other words, the end effector 54 keeps its orientation with respect to the base 11 while the first and second links are rotating. For example, if the first link 12 is moved 45° counter clockwise, the second link will move 90° in the clockwise direction while the end effector 54 rotates 45° in the counter clockwise direction. The end effector similarly moves toward or away from the first joint 24 and base 11.

A further advantage of this arrangement is that the housing 42 can be made with a relatively large diameter as compared with the end effector pulley 48. This is due to the second idler pulley 62 creating a ½ ratio between its second circumferential surface 66 and the end effector pulley 48. To establish the ½ ratio in the absence of the second idler pulley would require that the diameter of the end effector pulley 48 be twice the diameter of the circumferential surface 44 of the housing. As mentioned above, it is desired to have a relatively small end effector pulley 48. A relatively large end effector pulley 48 would produce increase the rotational inertia of the arm and make precise control of the arm 10 more difficult. Also, the relatively large diameter of housing 42 provides additional space in the center of the housing and second link pulley 38 where a bore 78 can be provided. The bore 78 allows wires, fiber optics, pneumatic or hydraulic hoses or other elongated components 90 to pass from the first link 12 to the second link 14 along the interior of the robot arm 10. Having these components 90 passing along the interior of the links 12 and 14 improves the appearance of the robot arm 10 and eliminates the possibility of those elongated components becoming caught on something or interfering with the movement of the robot arm. An additional bore 80 is provided in the center of the end effector pulley 48. This bore 80 can be used for transferring elongated components 90 from the second link 14 to the end effector 54.

In a further mode of operation, the first and second actuators 35 and 37 are operated to swing the first link 12 and fixed pulley 24 about first pivot axis 28 at the same rotational velocity. This swings the entire arm around the first pivot axis, without moving the end effector radially. The two modes of operation may be combined. Thus, the actuators can turn the fixed pulley and the first link simultaneously at different velocities.

I claim:

1. A robot arm comprising:
   a base;
   a first link and a second link, said first link having a proximal end and a distal end, said second link having a proximal end and a distal end;
      said proximal end of said first link being pivotally connected to said base for rotation relative thereto about a first pivot axis, said proximal end of said second link being pivotally mounted to said distal end of said first link for rotation relative thereto about a second pivot axis parallel to said first pivot axis;
   an end effector pivotally connected to said distal end of said second link for rotation relative thereto about a third pivot axis parallel to said first and second pivot axes, a fixed pulley rotatably mounted to said base on said first pivot axis defining a circumferential surface concentric with said first pivot axis;

a second-link pulley fixed to said second link for rotation therewith about said second pivot axis, said second-link pulley having a circumferential surface concentric with said second pivot axis;

a housing fixed to said first link defining a circumferential surface concentric with said second pivot axis;

an end effector pulley fixed to said end effector for rotation therewith about said third pivot axis, said end effector pulley having a circumferential surface concentric with said third pivot axis, a first belt drive including one or more belts connected between said circumferential surfaces of said fixed pulley and said second-link pulley so that upon rotation of said first link relative to said fixed pulley about said first pivot axis, said second link will rotate about said second pivot axis relative to said first link, said first belt drive being arranged to provide a first ratio between rotation of said first link relative to said fixed pulley and rotation of said second link relative to said fixed pulley;

a second belt drive including one or more belts connected between said circumferential surfaces of said housing and said end effector pulley so that upon rotation of said second link relative to said first link about said second pivot axis, said end effector will rotate about said third pivot axis relative to said second link, said second belt drive being arranged to provide a second ratio between rotation of said second link relative to said first link and rotation of said end effector relative to said second link;

one or more idler pulleys rotatably mounted to one or both of said links, each of said idler pulleys defining first and second circumferential surfaces, at least one of said belt drives including a first belt engaged with the first circumferential surface of an idler pulley and a second belt engaged with the second circumferential surface of the same idler pulley.

2. A robot arm as claimed in claim 1 wherein said first ratio is −2 whereby rotation of said first link through angle θ causes said second-link pulley and said second link to turn through angle −2θ with respect to said first link.

3. A robot arm as claimed in claim 1, wherein said second ratio is −½ whereby rotation of said second link through angle θ causes said end-effector pulley and said end-effector to turn through angle −½θ with respect to said second link.

4. A robot arm as claimed in claim 1, wherein said first and second circumferential surfaces of said idler pulley have different diameters.

5. A robot arm of claim 1, wherein said one or more idler pulleys comprises a first-drive idler pulley mounted on said first link, said first belt drive including said first-drive idler pulley.

6. A robot arm as claimed in claim 5, wherein said first belt drive comprises a first belt extending from said circumferential surface of said fixed pulley to said first circumferential surface of said first idler pulley.

7. A robot arm as claimed in claim 6, wherein said first belt drive comprises a second belt extending from said second circumferential surface of said first idler pulley to said second link pulley.

8. A robot arm as claimed in claim 7, wherein said first and second circumferential surfaces of said first idler pulley have a 1:1 diameter ratio.

9. A robot arm as claimed in claim 1, wherein said one or more idler pulleys include a second-drive idler pulley mounted on said second link.

10. A robot arm as claimed in claim 9, wherein said second belt drive comprises a first belt extending from said circumferential surface of said housing to said first circumferential surface of said second-drive idler pulley.

11. A robot arm as claimed in claim 10, wherein said second belt drive further comprises a second belt extending from said second circumferential surface of said second drive idler pulley to said end effector pulley.

12. A robot arm as claimed in claim 11, wherein the ratio of the diameter of said first circumferential surface of said second-drive idler pulley to the diameter at said second circumferential surface of said second-drive idler pulley is more than 1:1.

13. The robot arm as claimed in claim 1, wherein said first link and said second link are of equal length.

14. The robot arm as claimed in claim 1, further including elongated components, wherein said second-link pulley includes an internal bore where said elongated components extend from said first link to said second link.

15. The robot arm as claimed in claim 1, further including elongated components, wherein said end effector pulley includes an internal bore where said elongated components extend from said second link to said end effector.

16. The robot arm as claimed in claim 1, further including a first actuator connected to said base for rotation where said rotational driver rotates said first link about said first pivot axis.

* * * * *